J. McCLOSKEY.
Mechanical Movement.

No. 168,337.            Patented Oct. 5, 1875.

Witnesses:
Ernst Bilhuber
Elbert Dearborn

Inventor:
John McCloskey
per James A White
Attorney

UNITED STATES PATENT OFFICE.

JOHN McCLOSKEY, OF NEW YORK, N. Y.

IMPROVEMENT IN MECHANICAL MOVEMENTS.

Specification forming part of Letters Patent No. 168,337, dated October 5, 1875; application filed September 17, 1875.

*To all whom it may concern:*

Be it known that I, JOHN MCCLOSKEY, of the city, county, and State of New York, have invented an Improvement in Mechanical Movements, of which the following is a specification:

This invention consists in double eccentrics provided upon a driving-shaft, double cranks provided upon a secondary or driven shaft, and intermediate connecting-rods, the whole combined and arranged in such manner as to provide a simple and effective means whereby the rotary motion of the driving-shaft may be transmitted to the secondary shaft without the possibility of being reversed by any action exerted upon the latter.

Figure 1:
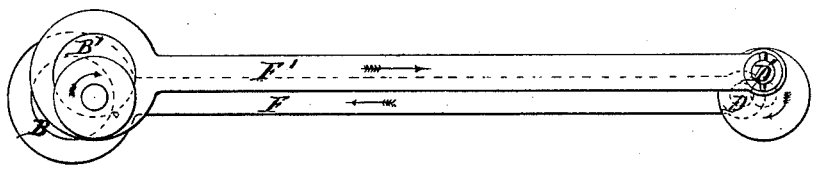
Figure 2:
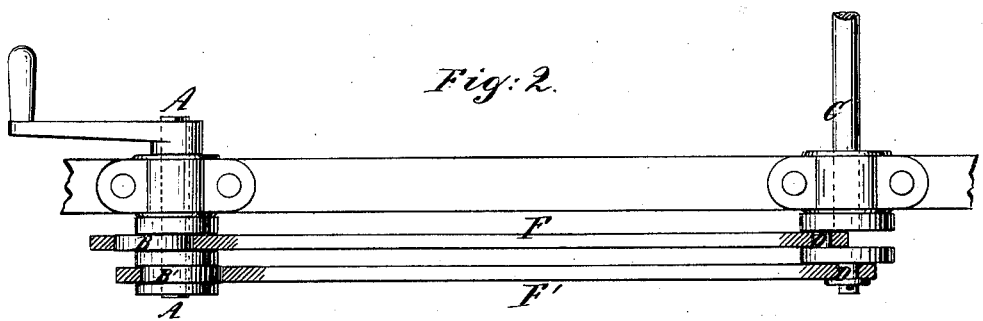

Figure 1 is a face or side view of a mechanical movement made according to my invention; and Fig. 2 is a partial sectional view of the same, taken in a plane at right angles to Fig. 1.

A is the driving-shaft, arranged for rotation in a suitable bearing or bearings, and provided with two eccentrics, B B', the line of greatest radius of one eccentric being placed as near as may be at right angles to that of the other. C is the secondary or driven shaft, supported, like the shaft A, in appropriate bearings. This shaft C is provided at one end with two cranks, D D', arranged at or near right angles to each other, and in the same planes as the eccentrics B B'. Each crank is connected with the coincident eccentric by a rod, the two connecting-rods being represented at F F'.

The apparatus being thus constructed, a rotary motion being given to the driving-shaft A, the rotation of the eccentrics will actuate the cranks connected therewith to rotate the secondary shaft C; but as the cranks F F' are incapable of rotating the eccentrics B B' when motion is attempted to be primarily given to the said cranks, any reverse movement or backlash arising from any action exerted upon the secondary or driven shaft C is effectually prevented.

What I claim as my invention is—

The combination of the double eccentrics B B' on the driving-shaft A with the double cranks D D' on the secondary or driven shaft C, and the connecting-rods F F', the whole arranged for operation substantially as and for the purpose set forth.

JOHN McCLOSKEY.

Witnesses:
 JAMES A. WHITNEY,
 H. WELLS, Jr.